US012716012B2

(12) United States Patent
Kuroo et al.

(10) Patent No.: US 12,716,012 B2
(45) Date of Patent: Aug. 25, 2026

(54) THERMALLY-CONDUCTIVE SHEET, METHOD FOR INSTALLING SAME, AND METHOD FOR MANUFACTURING SAME

(71) Applicant: SEKISUI POLYMATECH CO., LTD., Saitama (JP)

(72) Inventors: Kenta Kuroo, Saitama (JP); Hiromichi Iwazaki, Saitama (JP); Hiroki Kudoh, Saitama (JP)

(73) Assignee: SEKISUI POLYMATECH CO., LTD., Saitama (JP)

( * ) Notice: Subject to any disclaimer, the term of this patent is extended or adjusted under 35 U.S.C. 154(b) by 78 days.

(21) Appl. No.: 18/840,172

(22) PCT Filed: Mar. 28, 2023

(86) PCT No.: PCT/JP2023/012649

§ 371 (c)(1),
(2) Date: Aug. 21, 2024

(87) PCT Pub. No.: WO2023/190585

PCT Pub. Date: Oct. 5, 2023

(65) Prior Publication Data

US 2025/0163299 A1 May 22, 2025

(30) Foreign Application Priority Data

Mar. 29, 2022 (JP) ................................ 2022-054381

(51) Int. Cl.

*C09J 7/35* (2018.01)
*B32B 7/12* (2006.01)
*C09J 5/06* (2006.01)

(Continued)

(52) U.S. Cl.

CPC ..................................... *C09J 7/35* (2018.01); *B32B 7/12* (2013.01); *C09J 5/06* (2013.01); *C09J 9/00* (2013.01);

(Continued)

(58) Field of Classification Search

CPC ......... C09J 7/35; C09J 5/06; C09J 9/00; C09J 11/04; C09J 2203/326; C09J 2301/408;

(Continued)

(56) References Cited

U.S. PATENT DOCUMENTS

2008/0291634 A1* 11/2008 Weiser .................... C09K 5/14 361/708
2010/0006798 A1 1/2010 Endo (Continued)

FOREIGN PATENT DOCUMENTS

EP 1 383 169 1/2004
EP 3992252 A1 * 5/2022 ............. C08L 83/04

(Continued)

OTHER PUBLICATIONS

International Search Report issued May 23, 2023 in International (PCT) Application No. PCT/JP2023/012649.

*Primary Examiner* — Michael N Orlando
*Assistant Examiner* — Abhishek A Patwardhan
(74) *Attorney, Agent, or Firm* — Wenderoth, Lind & Ponack, L.L.P.

(57) ABSTRACT

Provided is a heat-conductive sheet including: a binder component that is a mixture of a silicone matrix (A) and an alkyl silicone compound (B); and a heat-conductive filler (C) dispersed in the binder component, a content of the alkyl silicone compound (B) being 2.0 to 20 parts by mass with respect to 100 parts by mass of a total of the silicone matrix (A) and the alkyl silicone compound (B), and the heat-conductive sheet having an expansion coefficient X of −2.0% or more and less than 0%, as measured by a thermomechanical analyzer (TMA) in the conditions of a compressive load of 0.01 N, a measurement temperature of 30 to 80° C., and a heating rate of 2° C./minute.

9 Claims, 1 Drawing Sheet

(51) Int. Cl.

| | |
|---|---|
| ***C09J 9/00*** | (2006.01) |
| ***C09J 11/04*** | (2006.01) |
| ***C09K 5/14*** | (2006.01) |

(52) U.S. Cl.

CPC ................. *C09J 11/04* (2013.01); *C09K 5/14* (2013.01); *B32B 2307/302* (2013.01); *C09J 2203/326* (2013.01); *C09J 2301/408* (2020.08); *C09J 2301/414* (2020.08)

(58) Field of Classification Search

CPC .................. C09J 2301/414; B32B 7/12; B32B 2307/302; B32B 27/00; C09K 5/14; C08G 77/12; C08G 77/20; C08L 83/04; C09D 183/04; C08K 2003/0812; C08K 2003/2227; C08K 2201/001; C08K 3/013; C08K 5/5415; C08K 5/5419; H01L 23/3733; H01L 23/36; H01L 23/3737; C08J 5/18

See application file for complete search history.

(56) References Cited

U.S. PATENT DOCUMENTS

| | | | | |
|---|---|---|---|---|
| 2020/0385577 | A1* | 12/2020 | Kudoh | ....................... C08J 5/18 |
| 2021/0324255 | A1* | 10/2021 | Kudoh | ................ H01L 23/3737 |
| 2022/0048230 | A1* | 2/2022 | Imaizumi | ............... C08G 77/70 |

FOREIGN PATENT DOCUMENTS

| | | |
|---|---|---|
| JP | 2000-327917 | 11/2000 |
| JP | 2001-291807 | 10/2001 |
| JP | 2002-234952 | 8/2002 |
| JP | 2004-331835 | 11/2004 |
| WO | 01/76822 | 10/2001 |
| WO | 03/088315 | 10/2003 |
| WO | 2006/023860 | 3/2006 |
| WO | 2022/137762 | 6/2022 |
| WO | 2022/163192 | 8/2022 |

* cited by examiner

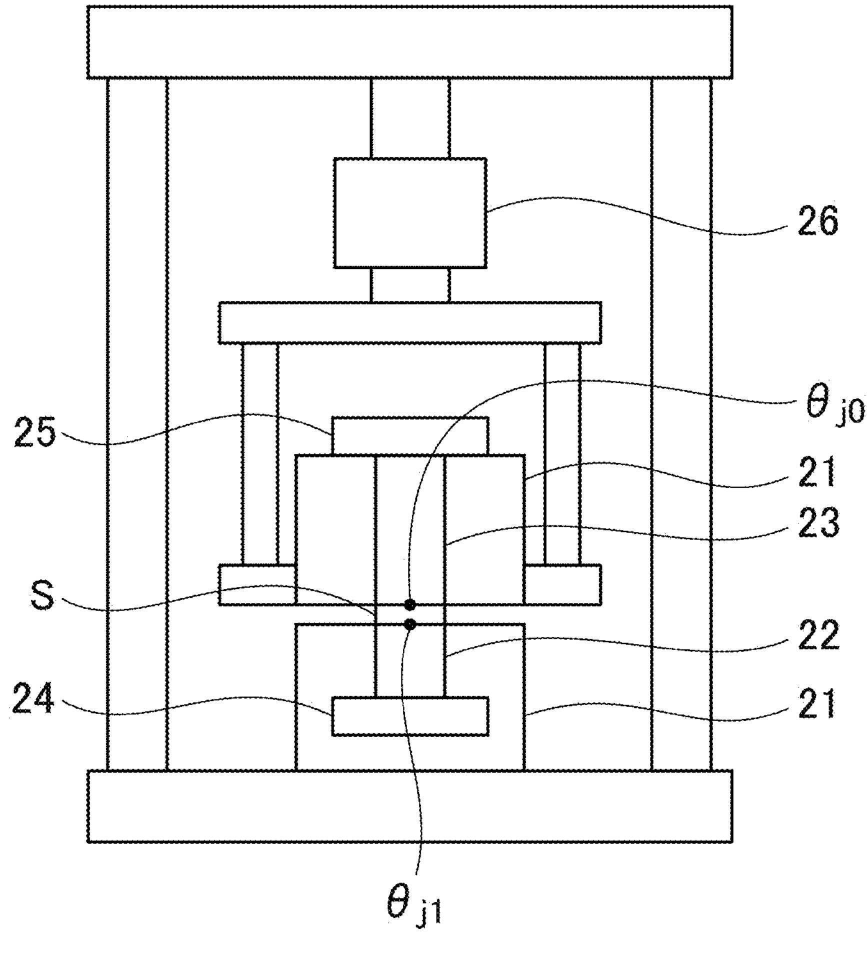
26
$\theta_{j0}$
25
21
23
S
22
24
21
$\theta_{j1}$

THERMALLY-CONDUCTIVE SHEET, METHOD FOR INSTALLING SAME, AND METHOD FOR MANUFACTURING SAME

TECHNICAL FIELD

The present invention relates to a heat-conductive sheet, for example, a heat-conductive sheet that is used in a state in which it is disposed between a heating element and a heat-dissipating element.

BACKGROUND ART

In electronic devices such as computers, car parts, and mobile phones, heat-dissipating elements such as heat sinks are generally used to dissipate heat generated from heating elements such as semiconductor elements and machine parts. It is known that a heat-conductive sheet is disposed between a heating element and a heat-dissipating element for the purpose of increasing the efficiency of heat transfer to the heat-dissipating element.

The heat-conductive sheet is required to have a followability to the heating element and the heat-dissipating element in order to further enhance the conduction efficiency. Accordingly, a phase-change-type heat-conductive sheet, a so-called phase change sheet, which is softened or melted by heating, has been studied. For example, PTL 1 discloses a heat-dissipation sheet that at least comprises an alkyl group-introduced silicone oil, an alpha-olefin, and heat-conductive filler, wherein the heat-dissipation sheet is putty-like at normal temperature and is softened to be fluidized by heating.

Further, a heat-conductive sheet including polymer gel is also known as a heat-conductive sheet. For example, PTL 2 discloses a thermally softened heat-dissipation sheet made of a composition that comprises polymer gel, a compound that is solid or paste-like at normal temperature and liquefied by heating, and heat-conductive filler, wherein the heat-dissipation sheet is softened by heating.

Further, PTL 3 discloses a heat-conductive sheet comprising a heat-conductive resin layer, wherein the heat-conductive resin layer comprises a binder resin containing a wax and a heat-conductive filler dispersed in the binder resin and silicone gel is used for the binder resin.

The phase change sheet and the heat-conductive sheets including polymer gel such as silicone gel disclosed in PTLs 1 to 3 above have a high flexibility and thus have a good followability to a heat-dissipating element and a heating element, thereby enhancing the thermal conductivity.

CITATION LIST

Patent Literatures

PTL1: JP 2004-331835 A
PTL2: JP 2002-234952 A
PTL3: JP 2001-291807 A

SUMMARY OF INVENTION

Technical Problem

Conventional heat-conductive sheets often include, as a matrix, an organic polymer having a crosslinked structure. It is known that, in such a case, the sheet expands due to the characteristics of the organic polymer when the temperature changes and increases. In general, each member (substrate, heating element, heat-dissipating element, etc.) within an electronic device also expands to a certain extent at high temperatures. Therefore, when a heat-conductive sheet is, for example, interposed and used between a heating element and a heat-dissipating element, the expansion of each member at high temperatures increases the load on the heating element and heat-dissipating element, which can cause various problems. Moreover, in recent years, as electronic devices have become smaller, each member in the electronic devices has been designed such that its rigidity has been lower. Thus, even small loads have become a concern.

It is therefore the object of the present invention to provide a heat-conductive sheet having excellent thermal conductivity and capable of showing smaller expansion at high temperatures to give a reduced load to the heating element, the heat-dissipating element, or the like.

Solution to Problem

As a result of diligent studies, the inventors have found that the aforementioned problems can be solved by providing a heat-conductive sheet comprising a binder component that is a mixture of a silicone matrix (A) and an alkyl silicone compound (B), and a heat-conductive filler (C) dispersed in the binder component, wherein the content of the alkyl silicone compound (B) in the heat-conductive sheet falls within a specific range, and the heat-conductive sheet has an expansion coefficient X within a certain range, as measured by a thermomechanical analyzer (TMA), thereby accomplishing the present invention described below. Specifically, the present invention provides [1] to below.

[1] A heat-conductive sheet comprising: a binder component that is a mixture of a silicone matrix (A) and an alkyl silicone compound (B), and a heat-conductive filler (C) dispersed in the binder component, a content of the alkyl silicone compound (B) being 2.0 to 20 parts by mass with respect to 100 parts by mass of a total of the silicone matrix (A) and the alkyl silicone compound (B), and the heat-conductive sheet having an expansion coefficient X of −2.0% or more and less than 0%, as measured by a thermomechanical analyzer (TMA) in the conditions of a heating rate of 2° C./minute, a compressive load of 0.01 N, and a measurement temperature of 30 to 80° C.

[2] The heat-conductive sheet according to [1], wherein the alkyl silicone compound (B) has a melting point of higher than 23° C. and 80° C. or less.

[3] The heat-conductive sheet according to [1] or [2] above, wherein the alkyl silicone compound (B) is a silicone compound comprising an alkyl group having 8 to 26 carbon atoms.

[4] The heat-conductive sheet according to any one of [1] to [3] above, wherein the heat-conductive filler (C) comprises an anisotropic filler, and the anisotropic filler is orientated in the thickness direction.

[5] The heat-conductive sheet according to any one of [1] to [4] above, wherein the heat-conductive filler (C) has a volume filling rate of 30 to 85 vol %.

[6] The heat-conductive sheet according to any one of [1] to [5] above, further comprising 0.1 to 18 parts by mass of a compatible substance (D) with respect to 100 parts by mass of a total of the silicone matrix (A) and the alkyl silicone compound (B).

[7] A heat dissipating member comprising: the heat-conductive sheet according to any one of [1] to [6]

above and a heat-dissipating element, wherein the heat-conductive sheet is mounted on a surface of the heat-dissipating element.

[8] A method for mounting a heat-conductive sheet, the method comprising: disposing a heat-conductive sheet on a surface of a first member, the heat-conductive sheet comprising: a binder component being a mixture of a silicone matrix (A) and an alkyl silicone compound (B); and a heat-conductive filler (C) dispersed in the binder component; the alkyl silicone compound (B) having a content of 2.0 to 20 parts by mass with respect to 100 parts by mass of a total of the silicone matrix (A) and the alkyl silicone compound (B), and the heat-conductive sheet having an expansion coefficient X of −2.0% or more and less than 0%, as measured by a thermomechanical analyzer (TMA) in the conditions of a heating rate of 2° C./minute, a compressive load of 0.01 N, and a measurement temperature of 30 to 80° C.; heating the heat-conductive sheet; and disposing a second member on a surface of the heat-conductive sheet, the surface being opposite from the first member side, and pressurizing the heat-conductive sheet, to install the heat-conductive sheet between the first and second members.

[9] The method for mounting a heat-conductive sheet according to [8] above, wherein the alkyl silicone compound (B) has a melting point higher than 23° C., and the heat-conductive sheet is heated to a temperature equal to or higher than the melting point or higher.

[10] A method for producing a heat-conductive sheet, the method comprising:

mixing at least a curable silicone composition (A1), an alkyl silicone compound (B), a heat-conductive filler (C), and a compatible substance (D), to obtain a mixed composition; and curing the mixed composition by heating.

[11] The method for producing a heat-conductive sheet according to [10] above, wherein the compatible substance (D) is an alkoxysilane compound.

Advantageous Effect of Invention

The present invention can provide a heat-conductive sheet having excellent thermal conductivity and capable of showing smaller expansion at high temperatures to give a reduced load to a heating element, a heat-dissipating element, or the like.

BRIEF DESCRIPTION OF DRAWING

FIG. 1 is a diagram for illustrating a measuring machine to measure the heat resistance value.

DESCRIPTION OF EMBODIMENTS

Heat-Conductive Sheet

Hereinafter, a heat-conductive sheet according to an embodiment of the present invention will be described in detail.

The heat-conductive sheet of the present invention comprises: a binder component that is a mixture of a silicone matrix (A) and an alkyl silicone compound (B); and a heat-conductive filler (C) dispersed in the binder component; a content of the alkyl silicone compound (B) being 2.0 to 20 parts by mass with respect to 100 parts by mass of a total of the silicone matrix (A) and the alkyl silicone compound (B), and the heat-conductive sheet having an expansion coefficient X of −2.0% or more and less than 0%, as measured by a thermomechanical analyzer (TMA) in the conditions of a heating rate of 2° C./minute, a compressive load of 0.01 N, a measurement temperature of 30 to 80° C.

The heat-conductive sheet of the present invention, which has such features described above, has excellent thermal conductivity and is capable of showing smaller expansion when used at high temperatures.

Expansion Coefficient X

The heat-conductive sheet of the present invention has an expansion coefficient X of −2.0% or more and less than 0%, as measured by a thermomechanical analyzer (TMA) in the conditions of a compressive load of 0.01 N, a measurement temperature of 30 to 80° C., and a heating rate of 2° C./minute. When the expansion coefficient X is over 0%, the expansion at high temperatures cannot be suppressed, so that the load on the heating element, the heat-dissipating element, or the like is increased. When the expansion coefficient X is less than −2.0%, the amount of the alkyl silicone compound (B) contained may be large; this may cause the alkyl silicone compound to bleed out onto the surface of the heat-conductive sheet, or may make it difficult for the silicone matrix and the alkyl silicone compound to disperse uniformly, so that the two separate, whereby pump-outs tend to occur. Further, the heat-conductive sheet tends to be brittle at a temperature equal to the melting point of the alkyl silicone compound or lower, and also, the heat resistance value of the heat-conductive sheet easily varies.

In the present invention, a large expansion coefficient means that the numerical value of the expansion coefficient is towards positive numbers. For example, when 0% and −2.0% are compared with each other, −2.0% means to be "a smaller expansion coefficient" or "capable of showing smaller expansion".

For suppressing the expansion of the heat-conductive sheet at high temperatures more and increasing the thermal conductivity, the expansion coefficient X is preferably −1.5% or more and −0.01% or less, more preferably −1.2% or more and −0.3% or less, further preferably −1.0% or more and −0.5% or less.

The expansion coefficient X can be adjusted to a desired value by regulating the type, the amount, and others of the alkyl silicone compound (B) contained in the heat-conductive sheet, which will be described below. Further, it is also possible to adjust it by the hardness of the silicone matrix, the shape and the amount of the heat-conductive filler to be loaded, the amount of the compatible substance (D) to be loaded or volatilized, in addition to regulating the alkyl silicone compound (B).

More specifically, the following approaches can be employed to adjust the expansion coefficient X to a small value: using an alkyl silicone compound having a low melting point, increasing the amount of the alkyl silicone compound to be mixed, reducing the hardness of the silicone matrix, increasing the amount of the heat-conductive filler to be loaded, and mixing the compatible substance (D) and allowing the compatible substance to remain in the heat-conductive sheet. Further, it is possible to adjust the expansion coefficient in a predetermined direction so as not to be excessively large by using an anisotropic filler as the heat-conductive filler and orienting it in a predetermined direction.

Furthermore, for increasing the flexibility and the thermal conductivity of the heat-conductive sheet, it is preferable to adjust the expansion coefficient X to the above-described range by adjusting the amount of the alkyl silicone compound to be mixed, while not increasing the hardness of the silicone matrix too much by adjusting the amount of the heat-conductive filler to be loaded within the later-described range.

The expansion coefficient X in the present invention means an expansion coefficient in the thickness direction of the heat-conductive sheet and is measured by a thermomechanical analyzer (TMA) in the following manner.

First, the heat-conductive sheet is compressed under a compressive load of 0.01 N at room temperature (23° C.). The thickness of the heat-conductive sheet at this time is taken as an initial thickness (mm).

Then, while the heat-conductive sheet is kept under the aforementioned compressive load, the temperature is raised at a heating rate of 2° C./minute from 30° C. to 80° C., to determine the expansion coefficient (%) at 30° C. and the expansion coefficient (%) at 80° C. each. The expansion coefficient X in the present invention is determined by the following formula.

$$\text{Expansion coefficient } X\text{ (\%)} = \text{Expansion coefficient (\%) at 80° C.} - \text{Expansion coefficient (\%) at 30° C.}$$

The expansion coefficient at 30° C. is determined from the thickness at 30° C. (mm) and the initial thickness (mm) of the heat-conductive sheet in the following manner. Likewise, the expansion coefficient at 80° C. is determined from the thickness at 80° C. (mm) and the initial thickness (mm) of the heat-conductive sheet in the following manner.

$$\text{Expansion coefficient (\%) at 30° C.} = 100\times[(\text{thickness at 30° C.} - \text{Initial thickness})/\text{Initial thickness}]$$

$$\text{Expansion coefficient (\%) at 80° C.} = 100\times[(\text{thickness at 80° C.} - \text{Initial thickness})/\text{Initial thickness}]$$

Silicone Matrix (A)

The silicone matrix (A) is preferably silicone having no fluidity at any of room temperature (23° C.) and high temperature (80° C.). Since the silicone matrix (A) has no fluidity, the shape retention of the heat-conductive sheet can be ensured at normal temperature and high temperature.

For example, silicone rubber may be used as the silicone matrix (A) in the present invention. Use of silicone rubber facilitates compressive deformation so that the heat-conductive sheet can be installed easily between a heating element and a heat-dissipating element. Further, use of silicone rubber can impart a certain compression characteristic to the heat-conductive sheet, so that the reliability can be enhanced.

The silicone to be used for the silicone matrix (A) may be any of the condensation reaction type and the addition reaction type, and is preferably the addition reaction type because of the following reasons: a large amount of the heat-conductive filler is easily filled therein, and the curing temperature can be easily adjusted by a catalyst or the like. The silicone matrix (A) can be obtained, for example, by curing a curable silicone composition (A1). The curable silicone composition (A1) maybe formed, for example, of a base resin and a curing agent.

In the case where the curable silicone composition (A1) is of the addition reaction type, it preferably contains an alkenyl group-containing organopolysiloxane as a base resin and hydrogen organopolysiloxane as a curing agent, in view of ease of filling a large amount of the heat-conductive filler.

The curable silicone composition (A1) is preferably in a liquid form before curing. In the case where the curable silicone composition (A1) is in a liquid form before curing, a large amount of the heat-conductive filler can be easily filled therein, and also the alkyl silicone compound (B) is easily dispersed in the curable silicone composition (A1). Herein, a liquid form means a liquid at normal temperature (23° C.) and a pressure of 1 atm.

Further, it is preferable to use a three-dimensionally crosslinked silicone matrix as the silicone matrix (A), in view of ensuring the shape retention of the heat-conductive sheet. In the case of, for example, an addition reaction type, this purpose may be achieved by curing a curable silicone composition (A1) containing: an alkenyl group-containing organopolysiloxane having at least three or more alkenyl groups in one molecule; or a hydrogen organopolysiloxane having at least three or more hydrogen atoms added to a silicon atoms.

The content of the silicone matrix (A) may be, for example, about 15 to 70 vol %, preferably 17 to 50 mass %, more preferably 20 to 39 mass %, with respect to the total amount of the heat-conductive sheet.

Alkyl Silicone Compound (B)

The heat-conductive sheet of the present invention contains 2.0 to 20 parts by mass of the alkyl silicone compound (B) with respect to 100 parts by mass of a total of the silicone matrix (A) and the alkyl silicone compound (B).

If the content of the alkyl silicone compound (B) is less than 2.0 parts by mass, the heat-conductive sheet easily expands at high temperatures to increase the load on the heating element, the heat-dissipating element, or the like, so that defects tend to occur. Further, the rigidity of the heat-conductive sheet at room temperature tends to be low, and therefore, the heat-conductive sheet easily elongates when the heat-conductive sheet is attached to the heating element or the heat-dissipating element, resulting in poor handleability.

If the content of the alkyl silicone compound (B) is over 20 parts by mass, the alkyl silicone compound may bleed out onto the surface of the heat-conductive sheet, or it is difficult for the silicone matrix and the alkyl silicone compound (B) to disperse uniformly, so that pump-outs tend to occur due to the separation of the two. Further, the heat resistance value of the heat-conductive sheet easily varies. Further, the heat-conductive sheet tends to be hard at room temperature, and therefore, cracks or breaks tend to occur when the heat-conductive sheet is attached to the heating element or the heat-dissipating element, resulting in poor handleability.

From these points of view, the content of the alkyl silicone compound (B) is preferably 2.5 parts by mass or more, more preferably 4 parts by mass or more, further preferably 8 parts by mass or more, and preferably 18 parts by mass or less, more preferably 15 parts by mass or less, with respect to 100 parts by mass of a total of the silicone matrix (A) and the alkyl silicone compound (B).

The silicone matrix (A) is formed from a curable silicone composition (A1), which will be described below. Accordingly, the content of the alkyl silicone compound (B)

described above is the same as the content of the alkyl silicone compound (B) with respect to 100 parts by mass of a total of the curable silicone composition (A1) and the alkyl silicone compound (B) in the mixed composition described later. The same also applies to the contents of the heat-conductive filler (C), the anisotropic filler, and the non-anisotropic filler, which will also be described later.

The binder component is preferably composed of the silicone matrix (A) and the alkyl silicone compound (B); however the binder component may contain resin components other than the silicone matrix (A) or plasticizers other than the alkyl silicone compound (B) as binder components, as long as the effects of the present invention are not impaired.

The alkyl silicone compound (B) to be used in the present invention may be a compound that is liquid at room temperature or a compound that is capable of being melted by heating at a certain temperature (for example, a temperature over 23° C. and 80° C. or less). In the case where the heat-conductive sheet contains a specific amount of a liquid compound or a compound that is capable of being melted by heating as the alkyl silicone compound (B), the heat-conductive sheet can exhibit enhanced flexibility when heated at high temperature and thus can easily adjust the aforementioned expansion coefficient X to a desired value.

The melting point of the alkyl silicone compound (B) is preferably 80° C. or less, more preferably 70° C. or less, further preferably 60° C. or less, even more preferably 50° C. or less, in view of melting the compound by heating at high temperature (for example, 80° C.).

The alkyl silicone compound (B) is preferably in a solid form at room temperature and a pressure of 1 atm. In the case where the compound is in a solid form at room temperature, the handleability can be enhanced, and for example, when performing the later-described cutting processing at a temperature around room temperature, the heat-conductive sheet can be easily obtained due to a predetermined rigidity. Accordingly, the melting point of the alkyl silicone compound is preferably higher than normal temperature (23° C.), more preferably 30° C. or more, further preferably 35° C. or more.

From above, the melting point of the alkyl silicone compound (B) is preferably over 23° C. and 80° C. or less, more preferably 30° C. or more and 70° C. or less, further preferably 35° C. or more and 60° C. or less, even more preferably 35° C. or more and 50° C. or less.

The melting point of the alkyl silicone compound is a temperature of the endothermic peak of the DTA curve, as measured using a thermogravimetric differential thermal analysis (TGDTA) at a heating rate of 1° C./min. In the case where the alkyl silicone compound is a mixture, the melting point is the temperature of the maximum endothermic peak in the aforementioned temperature range.

It is presumed that the alkyl silicone compound (B) is not compatible with the silicone matrix (A), and that the binder component has a sea-island structure, in which the silicone matrix (A) and the alkyl silicone compound (B) serve as the sea phase and the island phase, respectively. When the binder component has sea-island structure, the alkyl silicone compound (B) is kept to be held by the silicone matrix (A) even if it softens, melts, or becomes less viscous during heating, and accordingly, it is possible to suppress pump-outs while enhancing the flexibility. Further, since the heat-conductive sheet has a predetermined rebound resilience due to the silicone matrix (A) serving as the sea phase, it is possible to stably install the heat-conductive sheet without forming an air layer between the heat-conductive sheet and the heating element, the heat-dissipating element, or the like.

Examples of the alkyl silicone compound include compounds having a polysiloxane skeleton in the main chain, and an alkyl group. The alkyl group is an alkyl group bound to a silicon atom and the alkyl silicone compound preferably contains an alkyl group having 8 or more carbon atoms.

Among others, an alkyl silicone compound represented by the following formula (1) is preferable as the alkyl silicone compound.

(1)

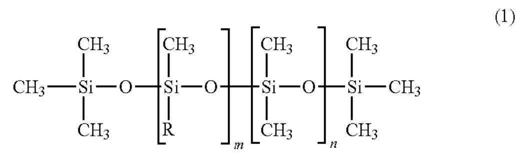

wherein R represents an alkyl group having 8 or more carbon atoms, m and n are integers that satisfy min in the range of 100:0 to 50:50, and m+n is an integer of 20 or more and 1000 or less.

The alkyl group having 8 or more carbon atoms may be linear or branched but is preferably a linear alkyl group.

Here, the number of carbon atoms in the alkyl group is preferably in the range of 8 to 26, more preferably in the range of 12 to 22. An alkyl group having 8 or more carbon atoms as R can prevent an excessively low melting point of the alkyl silicone compound. An alkyl group having 26 or less carbon atoms as R tends to give an alkyl silicone compound having a melting point of 80° C. or less.

As used herein, the range represented by "to" means the range from the numerical value described before "to" as the lower limit to the numerical value described after "to" as the upper limit, both inclusive.

R is not specifically limited but is preferably a dodecyl group, a tetradecyl group, a pentadecyl group, a hexadecyl group, a heptadecyl group, an octadecyl group, a nonadecyl group, an icosyl group, a heneicosyl group, or a docosyl group, and more preferably an octadecyl group.

When m:n is 100:0, the properties of the alkyl silicone compound are close to those of a so-called hard resin at temperatures below the melting point. As min approaches 50:50, the properties become more like wax. In other words, when an alkyl silicone compound with an m:n ratio of 100:0 is used in an appropriate amount, the heat-conductive sheet is hard to a certain extent to easily improve handleability.

The alkyl silicone compound is particularly preferably polyoctadecyl methyl siloxane (R=18, m:n=100:0).

The alkyl silicone compound may be a compound other than the aforementioned compound represented by formula (1), and may be, for example, an alkyl silicone compound having a substituent other than an alkyl group.

Heat-Conductive Filler (C)

The heat-conductive sheet of the present invention further comprises the heat-conductive filler (C). The heat-conductive filler (C) is preferably dispersed in the binder component that is a mixture of the silicone matrix (A) and the alkyl silicone compound (B) and held by the binder component.

The heat-conductive filler preferably contains an anisotropic filler that is oriented in the thickness direction of the heat-conductive sheet, whereby the heat-conductive sheet tends to enhance the thermal conductivity. When the anisotropic filler is oriented in the thickness direction, the compression ratio is difficult to increase; however, in the present invention, the alkyl silicone compound (B) dispersed in the silicone matrix (A) can increase the compression ratio in the thickness direction.

When the anisotropic filler is oriented in the thickness direction, the long-axis direction is not necessarily strictly parallel to the thickness direction, and the long-axis direction inclined to some extent in the thickness direction is also considered to be oriented in the thickness direction. Specifically, those with the long-axis direction inclined at about less than 20° are also considered to be an anisotropic filler oriented in the thickness direction, and when such anisotropic filler are predominant (for example, over 60%, preferably over 80%, with respect to the total number of particles of the anisotropic filler) in the heat-conductive sheet, they are considered to be oriented in the thickness direction.

The content of the heat-conductive filler (C) is preferably 150 to 3000 parts by mass, more preferably 200 to 2000 parts by mass, further preferably 300 to 1000 parts by mass, with respect to 100 parts by mass of a total of the silicone matrix (A) and the alkyl silicone compound (B). When the content of the heat-conductive filler (C) are 150 parts by mass or more, a certain thermal conductivity can be imparted to the heat-conductive sheet. When the content is 1500 parts by mass or less, the heat-conductive filler (C) can be appropriately dispersed in the binder component. Further, it is possible to prevent the viscosity of the mixed composition, which will be described below, from increasing higher than necessary.

Further, the volume filling rate of the heat-conductive filler is preferably 30 to 85 vol %, more preferably 50 to 83 vol %, further preferably 61 to 80 vol %, with respect to the total amount of the heat-conductive sheet. When the volume filling rate is the aforementioned lower limit or more, a certain thermal conductivity can be imparted to the heat-conductive sheet. When the volume filling rate is the upper limit or less, the heat-conductive sheet is easily produced.

Anisotropic Filler

The anisotropic filler is a filler that has an anisotropic shape and is capable of being oriented. Examples of the anisotropic filler include fiber materials and flaky materials. The anisotropic filler has a high aspect ratio, specifically, an aspect ratio of over 2, and preferably has an aspect ratio of 5 or more. An anisotropic filler having an aspect ratio over 2 easily orients in one direction, for example, the thickness direction, and thus the thermal conductivity in the one direction, for example, the thickness direction of the heat-conductive sheet is easily enhanced. Further, the upper limit of the aspect ratio is not specifically limited, but is practically 100.

The aspect ratio is the ratio of the length in the long-axis direction to the length in the short-axis direction of the anisotropic filler. The aspect ratio means the fiber length/the fiber diameter when it is a fiber material, and means the length in the long-axis direction of a flake/the thickness thereof when it is a flaky material.

The content of the anisotropic filler in the heat-conductive sheet is preferably 10 to 500 parts by mass, more preferably 30 to 300 parts by mass, further preferably 50 to 250 parts by mass, with respect to 100 parts by mass of a total of the silicone matrix (A) and the alkyl silicone compound (B).

When the content of the anisotropic filler is 10 parts by mass or more, the thermal conductivity is easily enhanced. Further, when it is 500 parts by mass or less, the viscosity of the mixed composition, which will be described below, tends to be appropriate, and the orientation of the anisotropic filler is improved. Further, the dispersibility of the anisotropic filler in the silicone matrix (A) is also improved.

In the case where the anisotropic filler is a fiber material, the average fiber length is preferably 10 to 500 μm, more preferably 20 to 350 μm, further preferably 50 to 300 μm. Fibers of an anisotropic filler having an average fiber length of 10 μm or more are appropriately in contact with each other inside the heat-conductive sheet, to ensure a heat transfer path, so that the thermal conductivity of the heat-conductive sheet is improved.

When the anisotropic filler has an average fiber length of 500 μm or less, the bulk of the anisotropic filler is low, so that a large amount thereof can be filled in the binder component.

The average fiber length of fiber materials is preferably shorter than the thickness of the heat-conductive sheet. The average fiber length shorter than the thickness prevents the fiber materials from protruding from the surface of the heat-conductive sheet more than necessary.

The average fiber length can be calculated through observing the anisotropic filler with a microscope. More specifically, the fiber lengths of any 50 fibers of the anisotropic filler are measured, for example, using an electron microscope or optical microscope, and the average (arithmetic mean) thereof can be taken as an average fiber length.

In the case where the anisotropic filler is a flaky material, the average particle size is preferably 10 to 400 μm, more preferably 15 to 300 μm, further preferably 20 to 200 μm. Flakes of the anisotropic filler having an average particle size of 10 μm or more are easily in contact with each other in the heat-conductive sheet, to surely create a heat transfer path, so that the thermal conductivity of the heat-conductive sheet is enhanced. When the anisotropic filler has an average particle size of 400 μm or less, the bulk of the heat-conductive sheet to be low, so that a large amount of the anisotropic filler can be filled in the binder component.

The average particle size of the flaky material can be calculated by observing the anisotropic filler with a microscope and determining the major diameter as a diameter. More specifically, the major diameters of any 50 flakes of anisotropic filler are measured, for example, using an electron microscope or optical microscope, and the average (arithmetic mean) thereof can be taken as an average particle size.

As the anisotropic filler, any known material having a thermal conductivity may be used. The anisotropic filler is preferably diamagnetic in the case where it is to be oriented by the magnetic field orientation, as will be described below. The anisotropic filler may not be diamagnetic in the case where it is to be oriented by fluidized orientation or not oriented.

Specific examples of the anisotropic filler include carbon materials typified by carbon fibers and flaky carbon powder, metal materials typified by metal fibers, and metal oxides, boron nitride, metal nitride, metal carbide, metal hydroxide, and polyparaphenylene benzoxazole fibers. Among these, carbon materials are preferable in view of having a small specific gravity and a good dispersibility in the binder component. Among them, graphitized carbon materials having a high thermal conductivity are more preferable. A graphitized carbon material is diamagnetic when the graphite planes are aligned in a predetermined direction.

Boron nitride is also preferable as the anisotropic filler. Boron nitride is preferably used in the form of a flaky material, but is not limited thereto. The flaky boron nitride may be agglomerated or may not be agglomerated, but the flaky boron nitride is preferably partially or fully not agglomerated. The boron nitride or the like is also diamagnetic when the crystal planes are aligned in a predetermined direction.

The anisotropic filler generally has a thermal conductivity in the anisotropic direction (that is, long-axis direction) of 30 W/m·K or more, preferably 60 W/m·K or more, more preferably 100 W/m·K or more, further preferably 200 W/m·K or more, without specific limitation. The upper limit of the thermal conductivity of the anisotropic filler is not specifically limited, but is, for example, 2000 W/m·K or less. The thermal conductivity can be measured by the laser flash method or the like.

A single type of the anisotropic filler may be used alone, or two or more types of them may be used in combination. For example, at least two anisotropic fillers having different average particle sizes or average fiber lengths may be used as the anisotropic filler. It is considered that, when the anisotropic fillers having different sizes are used, particles of the small anisotropic filler enter between particles of the relatively large anisotropic filler, so that the binder component can be filled with the anisotropic fillers at a high density, and the heat conduction efficiency can thus be enhanced.

The carbon fiber used as the anisotropic filler is preferably a graphitized carbon fiber. Flaky graphite powder is preferable as flaky carbon powder. It is also preferable to use the graphitized carbon fiber and the flaky graphite powder in combination as the anisotropic filler.

The graphitized carbon fiber has graphite crystal planes aligned in the fiber axis direction and thus has high thermal conductivity in the fiber axis direction. Therefore, the thermal conductivity in a specific direction can be enhanced by aligning the fiber axis directions in a predetermined direction. The flaky graphite powder has graphite crystal planes aligned in the plane direction of the flake surface and thus has high thermal conductivity in the plane direction. Therefore, the thermal conductivity in a specific direction can be enhanced by aligning the flake surfaces in a predetermined direction. The graphitized carbon fiber and flaky graphite powder each preferably have a high degree of graphitization.

As the graphitized carbon materials such as graphitized carbon fibers and flaky graphite powder described above, graphitized products of the following raw materials can be used. Examples of the raw materials include condensed polycyclic hydrocarbon compounds such as naphthalene, PAN (polyacrylonitrile), and condensed heterocyclic compounds such as pitch. In particular, graphitized mesophase pitch, polyimide, or polybenzazole having a high degree of graphitization is preferably used. For example, when mesophase pitch is used, the pitch is oriented in the fiber axis direction due to its anisotropy in the spinning step, which will be described below, to give graphitized carbon fibers having excellent thermal conductivity in the fiber axis direction.

The form of the mesophase pitch used for the graphitized carbon fiber is not specifically limited, as long as it can be spun, and the mesophase pitch may be used alone or in combination with another raw material. However, use of the mesophase pitch alone, or in other words, a graphitized carbon fiber with a mesophase pitch content of 100% is most preferable in view of high thermal conductivity, spinnability, and quality stability.

The graphitized carbon fibers to be used may be those obtained by sequentially performing spinning, infusibilization, and carbonization, pulverizing or cutting into a predetermined particle size, and then graphitizing, or those obtained by carbonizing, pulverizing or cutting, and then graphitizing. In the case where pulverizing or cutting is performed before graphitization, a graphitized carbon fiber with a further improved thermal conductivity can be obtained, since polycondensation reaction and cyclization reaction are likely to proceed during graphitization on the surface newly exposed by pulverization, to enhance the degree of graphitization. In the case where the spun carbon fiber is pulverized after graphitization, the carbon fiber after graphitization is rigid and thus easy to pulverize, and carbon fiber powder having a relatively narrow fiber length distribution can be obtained by pulverization in a short time.

The average fiber length of the graphitized carbon fiber is preferably 10 to 500 μm, more preferably 20 to 350 μm, further preferably 50 to 300 μm, as mentioned above. The aspect ratio of each graphitized carbon fiber is over 2, preferably 5 or more, as mentioned above. The thermal conductivity of the graphitized carbon fiber is not specifically limited, but the thermal conductivity in the fiber axis direction is preferably 400 W/m·K or more, more preferably 800 W/m·K or more.

In the case where the heat-conductive sheet contains the anisotropic filler, the anisotropic filler may be exposed or may not be exposed on the sheet surface, but are preferably exposed. The sheet surface of the heat-conductive sheet can be a non-adhesive surface due to exposure of the anisotropic filler. The heat-conductive sheet serves as the main surface of the sheet, and the anisotropic filler may be exposed on any one of both faces of the sheet or may be exposed on both faces. In the case where the heat-conductive sheet has a non-adhesive sheet surface, it can be slid when it is installed into an electronic device or the like, improving the installability.

Non-Anisotropic Filler

The heat-conductive filler (C) in the present invention may contain a non-anisotropic filler, and the aforementioned anisotropic filler and the non-anisotropic filler may be used in combination.

Particularly, when used in combination with the anisotropic filler oriented in one direction, the non-anisotropic filler can intervene in the gap between particles of the oriented anisotropic filler, to further increase the thermal conductivity. The non-anisotropic filler is a filler that has substantially no anisotropy in shape and is not oriented in a predetermined direction even under an environment in which anisotropic filler is oriented in a predetermined direction, such as under the generation of magnetic force lines or the action of shear force, which will be described below.

The non-anisotropic filler has an aspect ratio of 2 or less, preferably 1.5 or less. When used in combination with the anisotropic filler, the non-anisotropic filler having such a low aspect ratio is likely to be positioned in the gaps between the anisotropic filler and thus tends to improve the thermal conductivity. Further, the non-anisotropic filler having an aspect ratio of 2 or less can prevent increase of the viscosity of the mixed composition, which will be described below, to achieve high filling rate.

Specific examples of the non-anisotropic filler include metals, metal oxides, metal nitrides, metal hydroxides, carbon materials, and oxides, nitrides, and carbides of others than metals. Examples of the shape of the non-anisotropic filler include spherical or amorphous powder.

For the non-anisotropic filler, examples of the metals include aluminum, copper, and nickel; examples of the metal oxides include aluminum oxide typified by alumina, magnesium oxide, and zinc oxide; and examples of the metal nitrides include aluminum nitride. Examples of the metal hydroxides include aluminum hydroxide. Examples of the carbon materials include spherical graphite. Examples of the oxides, nitrides, and carbides of others than metals include quartz, boron nitride, and silicon carbide.

Among these, aluminum oxide and aluminum are preferable, in view of their high thermal conductivity and availability of spherical materials.

The non-anisotropic fillers described above may be used singly or in combination of two or more.

The average particle size of the non-anisotropic filler is, for example, 0.1 to 200 μm. For example, when used in combination with the anisotropic filler, the average particle size of the non-anisotropic filler is preferably 0.1 to 50 μm, more preferably 0.5 to 35 μm, further preferably 1 to 15 μm. When the average particle size is 50 μm or less, defects such as disturbing the orientation of the anisotropic filler are less likely to occur, even when used in combination with the anisotropic filler. When the average particle size is 0.1 μm or more, the non-anisotropic filler has a specific surface area not increased more than necessary, and even when such a non-anisotropic filler is contained in a large amount, the viscosity of the mixed composition is difficult to increase so that a large amount of the non-anisotropic filler is easily filled.

As the non-anisotropic filler, at least two non-anisotropic fillers having different average particle sizes may be used, for example.

The average particle size of the non-anisotropic filler is preferably 0.1 to 200 μm, more preferably 0.5 to 100 μm, further preferably 1 to 70 μm.

The average particle size of the non-anisotropic filler can be measured through observation with an electron microscope or the like. More specifically, the particle sizes of any 50 particles of the non-anisotropic filler are measured, for example, using an electron microscope or optical microscope, and the average (arithmetic mean) thereof can be taken as an average particle size.

The content of the non-anisotropic filler is preferably 50 to 2500 parts by mass, more preferably 100 to 1500 parts by mass, further preferably 200 to 750 parts by mass, with respect to 100 parts by mass of a total of the silicone matrix (A) and the alkyl silicone compound (B). When it is 50 parts by mass or more, the thermal conductivity of the heat-conductive sheet can be improved. When it is 1500 parts by mass or less, the non-anisotropic filler is appropriately dispersed in the binder component, and the effect of enhancing the thermal conductivity according to the content can be obtained. Also, the viscosity of the mixed composition can be prevented from increasing more than necessary.

The mass ratio of the content of the non-anisotropic filler to the content of the anisotropic filler is not specifically limited but is preferably 0.5 to 5, more preferably 1 to 3, preferably 1.1 to 2.5. When the mass ratio is within the aforementioned range, particles of the non-anisotropic filler can be appropriately filled between particles of the anisotropic filler to form an efficient heat transfer path, and thus the thermal conductivity of the heat-conductive sheet can be furthermore improved.

Additives

In the heat-conductive sheet, the binder component may further contain various additives, as long as the functions of the heat-conductive sheet are not impaired. Examples of the additives include at least one or more selected from dispersants, coupling agents, pressure-sensitive adhesives, flame retardants, antioxidants, colorants, and anti-settling agents. When curing the curable silicone composition (A1) as mentioned above, a curing catalyst or the like to accelerate curing may be contained as an additive. Examples of the curing catalyst include a platinum catalyst.

The mixed composition may contain a compatible substance (D), as will be described below. The compatible substance (D) may volatilize in the process of producing the heat-conductive sheet so as not to remain, or the compatible substance (D) contained may at least partially remain, in the heat-conductive sheet.

Compression Ratio

The heat-conductive sheet of the present invention preferably has a compression ratio at 40 psi of 15% or more. When the compression ratio of the heat-conductive sheet is 15% or more, the heat-conductive sheet exhibits increased flexibility upon heating to thereby enhance the followability to the heating element or the heat-dissipating element during use, thus resulting in enhanced thermal conductivity. The compression ratio is preferably 18% or more, more preferably 20% or more, for enhancing the flexibility during use to enhance the thermal conductivity.

Further, the compression ratio described above is preferably 50% or less. The compression ratio of 50% or less facilitates enhancing the handleability and the reliability, and also facilitates install in electronic devices and cutting processing, and further when the compression ratio is 50% or less, pump-outs or the like are less likely to occur. In view of these, the compression ratio described above is more preferably 40% or less, further preferably 38% or less.

The compression ratio is measured by the method described in Examples.

Thickness

The thickness of the heat-conductive sheet is not specifically limited, and the thickness may be appropriately set according to the shape or application of the electronic device in which the heat-conductive sheet is installed, and the thickness is, for example, in the range of 0.1 to 5 mm.

Further, for the ease of use in small electronic devices or the like, the thickness of the heat-conductive sheet is preferably 0.1 to 3 mm, more preferably 0.1 to 1 mm.

Method for Producing Heat-Conductive Sheet

The heat-conductive sheet of the present invention can be produced by a production method including step X and step Y below.

Step X: mixing at least the curable silicone composition (A1), the alkyl silicone compound (B), the heat-conductive filler (C), and the compatible substance (D), to obtain a mixed composition Step Y: curing the mixed composition obtained in step X by heating Hereinafter, each step will be described in detail.

Step X

In step X, the curable silicone composition (A1), the alkyl silicone compound (B), and the heat-conductive filler (C), and, in addition, the compatible substance (D) are mixed to obtain a mixed composition. The compatible substance (D)

is a substance that is compatible to or dissolved in the alkyl silicone compound (B) and the curable silicone composition (A1). The alkyl silicone compound (B) has a lower compatibility with the curable silicone composition (A1), but can be uniformly mixed with the curable silicone composition (A1) by using the compatible substance (D). Therefore, the alkyl silicone compound (B) is uniformly mixed in the silicone matrix (A), which is to be obtained by curing the curable silicone composition (A1).

The term "compatible" refers to the state where, when the compatible substance (D) and the alkyl silicone compound (B), or the compatible substance (D) and the curable silicone composition (A1) are mixed at a ratio at which they are actually used, the two phase are not separated. The term "soluble" refers to the state where, when the compatible substance (D) and the alkyl silicone compound (B), or the compatible substance (D) and the curable silicone composition (A1) are mixed at a ratio at which they are actually used, there is no residue in solid form.

In step X, the mixing method and the mixing order are not specifically limited, as long as a mixed composition can be obtained by mixing the aforementioned components. The curable silicone composition (A1), the alkyl silicone compound (B), the heat-conductive filler (C), the compatible substance (D), and any other components to be added as required may be appropriately mixed in any order, to obtain a mixed composition.

The curable silicone composition (A1) is, for example, composed of a base resin and a curing agent, as mentioned above, and in such a case, the base resin, the curing agent, the alkyl silicone compound (B), the heat-conductive filler (C), the compatible substance (D), and any other components added as required may be mixed in any order, to obtain a mixed composition.

The form of the mixed composition may be either one-pack type or two-pack type, in which the first agent and the second agent are used in combination. In the case of the two-pack type, the mixed composition is obtained by mixing the first agent and the second agent when use.

More specifically, the mixed composition of two-pack type includes the first agent containing an alkenyl group-containing organopolysiloxane (base resin) and the second agent containing hydrogen organopolysiloxane (curing agent). The second agent may further contain an alkenyl group-containing organopolysiloxane. In one mode of the mixed composition of two-pack type, a curing catalyst is contained in the first agent. In this case, the alkyl silicone compound (B), the heat-conductive filler (C), and the compatible substance (D) may be contained in either the first agent or the second agent but preferably contained in both.

The alkyl silicone compound (B) is preferably dissolved in the compatible substance (D) and then mixed with the curable silicone composition (A1) and other components.

In this case, a mixture of the alkyl silicone compound (B) and the compatible substance (D), the curable silicone composition (A1) (or the base resin and the curing agent), the heat-conductive filler (C), and any other components added as required may be mixed in any order, to obtain a mixed composition.

When the alkyl silicone compound (B) is dissolved in the compatible substance (D) in step X in this way, the alkyl silicone compound (B) can be mixed in the silicone matrix (A) more uniformly.

In the case where the alkyl silicone compound (B) is dissolved in the compatible substance (D), they may be appropriately heated. The heating temperature is preferably higher than the melting point of the compatible substance (D) and may be, for example, 40° C. or more for dissolution. In the case where the compatible substance (D) is mixed in the base resin and the curing agent, the upper limit of the heating temperature may be a temperature at which the thermal conductive silicone does not substantially cure in the process of mixing. In the case where the compatible substance (D) is mixed in each of the base resin and the curing agent, the upper limit can be a temperature at which the compatible substance (D) is difficult to volatilize and may be, for example, 80° C. or less for dissolution.

The mixed state of the silicone matrix (A) and the alkyl silicone compound (B) is a homogeneous mixture that is transparent or slightly cloudy due to the presence of the compatible substance (D). In the case where the compatible substance (D) is not contained, a solid alkyl silicone compound is dispersed, or a liquid alkyl silicone compound is separated to form two layers.

Compatible Substance (D)

The compatible substance (D) to be used in the present invention is preferably a substance that is dissolved in the alkyl silicone compound (B) and is compatible with the curable silicone composition (A1). The compatible substance (D) is preferably a substance that is liquid at normal temperature (23° C.) and a pressure of 1 atm. The compatible substance (D) is, for example, a component that volatilizes by heating at about 50 to 180° C. in step Y, as will be described below. Since the compatible substance (D) volatilizes by heating at the time of the curing, the content of the heat-conductive filler (C) in the heat-conductive sheet can be increased. Further, the mixed composition has a reduced viscosity due to containing the compatible substance (D). Therefore, the amount of the heat-conductive filler (C) to be mixed are easily increased, and further the anisotropic filler is easily oriented in a predetermined direction by magnetic field orientation or the like, which will be described below.

Examples of the compatible substance (D) include alkoxysilane compounds, hydrocarbon solvents, and alkoxysiloxane compounds. These compounds have high solubility or compatibility with the alkyl silicone compound (B) and the curable silicone composition (A1), and thus can enhance the dispersibility of the alkyl silicone compound (B) in the curable silicone composition (A1) in the mixed composition. Thus, the alkyl silicone compound (B) is appropriately dispersed also in the heat-conductive sheet, and as a result, the shape retention, the reliability, the flexibility at high temperature, and the like are easily ensured.

The compatible substance (D) may be used singly or in combination of two or more.

The compatible substance (D) to be used is preferably an alkoxysilane compound. In the case where the alkoxysilane compound is used, the appearance is improved, and specifically, air voids or the like are not seen in the surface of the heat-conductive sheet obtained by curing.

The alkoxysilane compound to be used as the compatible substance (D) is a compound having a structure in which, among the 4 bonds from a silicon atom (Si), 1 to 3 bonds each attach to an alkoxy group, and the residual bonds each attach to an organic substituent. The alkoxysilane compound, which has the alkoxy group(s) and the organic substituent(s), can enhance the dispersibility of the alkyl silicone compound (B) in the curable silicone composition (A1).

Examples of the alkoxy group of the alkoxysilane compound include methoxy groups, ethoxy groups, protoxy groups, butoxy groups, pentoxy groups, and hexatoxy groups. In the curable silicone composition (A1), the alkoxysilane compound may be contained in the form of a dimer.

Among such alkoxysilane compounds, an alkoxysilane compound having at least either one of a methoxy group and an ethoxy group is preferable, in view of the availability. The number of alkoxy groups in the alkoxysilane compound is preferably 2 or 3, more preferably 3, in view of the compatibility, the solubility, and the like, with the curable silicone composition (A1) and the alkyl silicone compound (B). Specifically, the alkoxysilane compound is preferably at least one selected from trimethoxysilane compounds, triethoxysilane compounds, dimethoxysilane compounds, and diethoxysilane compounds.

Examples of the functional group contained in the organic substituent of the alkoxysilane compound include an acryloyl group, an alkyl group, a carboxyl group, a vinyl group, a methacryl group, an aromatic group, an amino group, an isocyanate group, an isocyanurate group, an epoxy group, a hydroxyl groups, and a mercapto group. Here, when using a platinum catalyst as a curing catalyst of the curable silicone composition (A1), an alkoxysilane compound that is difficult to affect the curing reaction of organopolysiloxane is preferably selected and used. Specifically, when using an addition reaction type organopolysiloxane with a platinum catalyst, the organic substituent of the alkoxysilane compound is preferably free from an amino group, an isocyanate group, an isocyanurate group, a hydroxyl group, or a mercapto group.

The alkoxysilane compound preferably contains an alkylalkoxysilane compound having an alkyl group bound to a silicon atom, that is, an alkoxysilane compound having an alkyl group as an organic substituent, in view of enhancing the dispersibility of the alkyl silicone compound (B) in the silicone matrix (A). Accordingly, a dialkyl dialkoxysilane compound and an alkyltrialkoxysilane compound are preferable, and among them, an alkyltrialkoxysilane compound is preferable.

The number of carbon atoms of the alkyl group bound to the silicon atom may be, for example, 1 to 16. In the trialkoxysilane compound such as trimethoxysilane compounds and triethoxysilane compounds, the number of carbon atoms of the alkyl group is preferably 6 or more, further preferably 8 or more, and preferably 12 or less, more preferably 10 or less, in view of enhancing the dispersibility of the alkyl silicone compound.

In the dialkoxysilane compound such as dimethoxysilane compounds and triethoxysilane compounds, the number of carbon atoms of the alkyl group may be 1 or more, and is preferably 10 or less, more preferably 6 or less, further preferably 4 or less, in view of enhancing the dispersibility of alkyl silicone compound.

Examples of the alkyl group-containing alkoxysilane compound include methyltrimethoxysilane, dimethyldimethoxysilane, diethyldimethoxysilane, trimethylmethoxysilane, methyltriethoxysilane, dimethyldiethoxysilane, ethyltrimethoxysilane, n-propyltrimethoxysilane, di-n-propyldimethoxysilane, di-n-propyldiethoxysilane, isobutyltrimethoxysilane, isobutyltriethoxysilane, isobutyltrimethoxysilane, isobutyltriethoxysilane, n-hexyltrimethoxysilane, n-hexyltriethoxysilane, methylcyclohexyldimethoxysilane, methylcyclohexyldiethoxysilane, n-octyltrimethoxysilane, n-octyltriethoxysilane, n-decyltrimethoxysilane, and n-decyltriethoxysilane.

Among the alkyl group-containing alkoxysilane compounds, n-decyltrimethoxysilane, dimethyldimethoxysilane, and n-octyltriethoxysilane are further preferable, in view of improving the dispersibility of the alkyl silicone compound (B), and n-decyltrimethoxysilane and n-octyltriethoxysilane are furthermore preferable, in view of the solubility in the alkyl silicone compound (B).

An alkoxysiloxane compound used as the compatible substance (D) has two or more siloxane bonds, and has a structure in which at least one silicon atom has an alkoxy group. The alkoxysiloxane compound has a structure in which at least one of the silicon atoms constituting the siloxane bond has an organic substituent. The alkoxysiloxane compound, which has an alkoxy group and an organic substituent, can enhance the dispersibility of the alkyl silicone compound (B).

Examples of the alkoxy group and the organic substituent of the alkoxysiloxane compound include those described above for the alkoxysilane compound, and the alkoxysiloxane compound preferably has at least an alkyl group in view of enhancing the dispersibility of the alkyl silicone compound (B).

Examples of the alkoxysiloxane compound include methylmethoxysiloxane oligomer, methylphenylmethoxysiloxane oligomer, methylepoxymethoxysiloxane oligomer, methylmercaptomethoxysiloxane oligomer, and methylacryloylmethoxysiloxane oligomer.

The alkoxysiloxane compounds may be used singly or in combination of two or more.

Examples of the hydrocarbon solvent used as the compatible substance (D) include aromatic hydrocarbon solvents. Among them, aromatic hydrocarbon solvents are preferable, in view of the compatibility to the curable silicone composition (A1). Examples of the aromatic hydrocarbon solvents include aromatic hydrocarbon solvents having about 6 to 10 carbon atoms such as toluene, xylene, mesitylene, ethyl benzene, propyl benzene, butyl benzene, and t-butyl benzene, preferably toluene and xylene.

In the mixed composition, the content of the compatible substance (D) is preferably 6 to 60 parts by mass with respect to 100 parts by mass of a total of the curable silicone composition (A1) and the alkyl silicone compound (B). When the content is 6 parts by mass or more, the uniformity when the alkyl silicone compound (B) is mixed with the curable silicone composition (A1) can be sufficiently enhanced. When the content is 60 parts by mass or less, effects according to the amount of the compatible substance (D) used can be obtained. From these points of view, the content of the compatible substance (D) is more preferably 10 to 50 parts by mass, further preferably 15 to 45 parts by mass.

At this time, if the alkyl silicone compound (B) is not uniformly mixed, the alkyl silicone compound remains undissolved, and, as a result, a solid alkyl silicone compound is in a dispersed state, for example. Such dispersed solids may have properties as a filler in the mixed composition. In other words, the undissolved solids serve as a part of the filler, which increases the viscosity, and as a result, it may be difficult to increase the amount of the heat-conductive filler to be mixed.

In the mixed composition, the content of the compatible substance (D) is preferably larger than the content of the alkyl silicone compound (B), in view of enhancing the dispersibility of the alkyl silicone compound (B).

The compatible substance (D) preferably partially or fully volatilizes by heating in step Y. Accordingly, the compatible substance (D) may not be contained in the heat-conductive sheet, or may be contained in the heat-conductive sheet in an amount of less than the content in the mixed composition.

In the case where the compatible substance (D) is contained in the heat-conductive sheet, 2 to 30 mass % of the compatible substance (D) contained in the mixed composition preferably remains to be contained. Specifically, the content of the compatible substance (D) in the heat-conductive sheet is preferably 0.1 to 18 parts by mass, more preferably 0.3 to 15 parts by mass, further preferably 1 to 10 parts by mass, with respect to 100 parts by mass of a total of the silicone matrix (A) and the alkyl silicone compound (B). When the content of the compatible substance (D) falls within such a range, the flexibility of the heat-conductive sheet can be enhanced.

The detailed descriptions of the components other than the compatible substance (D) in the mixed composition (that is, the curable silicone composition (A1), the alkyl silicone compound (B), the heat-conductive filler (C), other additives, etc.) are as described above. The contents of the alkyl silicone compound (B) and the heat-conductive filler (C) in the mixed composition are also as mentioned above. Although the content of each component shown above is the amount with respect to 100 parts by mass of a total of the silicone matrix (A) and the alkyl silicone compound (B), the amount in the mixed composition is an amount with respect to 100 parts by mass of a total of the curable silicone composition (A1) and the alkyl silicone compound (B).

Step Y

Step Y is a step of curing the mixed composition by heating. The temperature when heating the mixed composition is not specifically limited as long as the curable silicone composition (A1) can be cured by heating. The temperature may be higher than room temperature (23° C.), and is preferably 50° C. or more. Further, the heating temperature is not specifically limited and the heating temperature may be about a temperature at which the heat-conductive sheet and the mixed composition are not thermally degraded, and is, for example, 180° C. or less, and preferably 150° C. or less. The mixed composition may be heated in a single stage or in two or more stages. When heating in two or more stages, the heating temperature may fall within the aforementioned range in at least any one of the stages but preferably falls within the aforementioned range in all the stages. The total heating time is, for example, about 10 minutes to 3 hours. When heating in two or more stages, the mixed composition may be semi-cured in the first stage, and the mixed composition may be fully cured by heating in the second and subsequent stages, for example.

In step Y, the mixed composition may be formed into a predetermined shape such as a block and a sheet, and cured by heating. In the case where the mixed composition contains the anisotropic filler as the heat-conductive filler (C), the anisotropic filler is preferably oriented in one direction before the mixed composition is cured by heating in step Y. The anisotropic filler can be oriented by the magnetic field orientation method or the flow orientation method, and is preferably oriented by the magnetic field orientation method.

In the magnetic field orientation method, the mixed composition may be injected into a mold or the like and placed in the magnetic field, and then the anisotropic filler may be oriented along the magnetic field. Then, an oriented molded product may be obtained by curing the curable silicone composition (A1). The mixed composition may be cured under the heating conditions, as described above.

The oriented molded product is preferably in the form of a block but may be in the form of sheets. When in the form of sheets, the oriented molded product can be used as heat-conductive sheets as they are without slicing. When producing the oriented molded product in the form of a block, the orientation of the anisotropic filler is enhanced.

In the magnetic field orientation method, a release film may be disposed on the portion in contact with the mixed composition in the mold. The release film to be used is, for example, a resin film having good releasability or a resin film having one side treated with a release agent. Use of a release film makes it easy to release the oriented molded product from the mold.

In the magnetic field orientation method, the viscosity of the mixed composition to be used is preferably 10 to 300 Pa·s in view of orientation of the magnetic field. When it is 10 Pa·s or more, the heat-conductive filler (C) tends not to settle down. When it is 300 Pa·s or less, the mixed composition has an improved fluidity to appropriately orient the anisotropic filler in the magnetic field, and thus the problems, such as the orientation taking too much time, do not arise. The viscosity is measured using a rotational viscometer (Brookfield viscometer DV-E, spindle SC4-14) at 25° C. and a rotational speed of 10 rpm.

In the case of using the heat-conductive filler (C) unlikely to settle down or combining with an additive such as an anti-settling agent, the viscosity of the mixed composition may be less than 10 Pa·s.

For the magnetic field orientation method, a superconducting magnet, a permanent magnet, an electromagnet, or the like can be mentioned as a magnetic force line source for applying the magnetic force lines. A superconducting magnet is preferable in view of generating a magnetic field with high magnetic flux density. The magnetic flux density of the magnetic field generated from such a magnetic force line source is preferably 1 to 30 tesla. When the magnetic flux density is 1 tesla or more, the anisotropic filler made of carbon materials or the like can be easily oriented. When it is 30 tesla or less, practical production is enabled.

In the flow orientation method, a shear force is applied to the mixed composition, to produce a primary sheet in which the anisotropic filler is oriented along the plane direction. More specifically, in the flow orientation method, the mixed composition prepared in step X is first flattened and stretched while applying a shear force to form a sheet (primary sheet). The anisotropic filler can be oriented in the shearing direction by applying a shear force. For forming the sheet, the mixed composition may be applied onto a base film, for example, using a coating applicator such as a bar coater and a doctor blade, or by extrusion molding or discharging from a nozzle, and then the applied mixed composition may be dried, semi-cured, or full cured, as required. The thickness of the primary sheet is preferably about 50 to 5000 μm. In the primary sheet, the anisotropic filler is oriented in one direction along the plane direction of the sheet.

The mixed composition used in the flow orientation method has a relatively high viscosity so that a shear force is applied when the composition is stretched into a sheet. Specifically, the viscosity of the mixed composition is preferably 3 to 500 Pa·s.

The primary sheet may be used as a heat-conductive sheet as it is without being formed into a block, as will be described below. Alternatively, a laminate block (an oriented molded product in the form of a block) may be formed by layering a plurality of primary sheets so that the orientation directions coincide, and bonding the primary sheets to each other by hot press or the like while optionally heating for curing.

In the case of forming a laminate block, at least one of the surfaces of the primary sheets that are to face each other may be irradiated with vacuum ultraviolet rays before the primary sheets are layered. When the primary sheets are layered through the surface irradiated with vacuum ultraviolet rays, the primary sheets can be bonded each other firmly. In the case of irradiation with vacuum ultraviolet rays, the mixed composition may be fully cured when producing the primary sheets, and curing by heating or the like is not necessary when the primary sheets are layered to form a laminate block.

Also in the flow orientation method, the mixed composition may be cured under the heating conditions as described above.

In the case of forming an oriented molded product in the form of a block as mentioned above, the oriented molded product obtained may be cut by slicing or the like in a direction perpendicular to the direction in which the anisotropic filler is oriented, to form sheet-form products. Slicing may be performed, for example, with a shearing blade. As a result of cutting such as slicing, the sheet-form products have the tips of the anisotropic filler exposed from the binder component in each surface that is a cut surface.

The sheet-form products obtained by cutting may be used as the heat-conductive sheet as they are or may be subjected to another treatment. For example, each surface that is a cut surface may be polished. The surface may be polished using polishing paper, for example.

Usage of Heat-Conductive Sheet

The heat-conductive sheet of the present invention is used inside an electronic device or the like. Specifically, the heat-conductive sheet is interposed between two members and is used to conduct heat from one member to the other member. Specifically, the heat-conductive sheet is interposed between a heating element and a heat-dissipating element, to move heat generated in the heating element to the heat-dissipating element by heat conduction and dissipate the heat from the heat-dissipating element. Here, examples of the heating element include various electronic parts used inside electronic devices such as CPUs, power semiconductors, and power sources. Examples of the heat-dissipating element include heat sinks, heat pumps, and metal housings of electronic devices. The heat-conductive sheet is preferable to be compressed with its two surfaces in close contact with the heating element and the heat-dissipating element, respectively, when use.

Method for Mounting Heat-Conductive Sheet

The present invention also provides a method for mounting the heat-conductive sheet. As described above, the heat-conductive sheet of the present invention comprises: a binder component that is a mixture of a silicone matrix (A) and an alkyl silicone compound (B); and a heat-conductive filler (C) dispersed in the binder component; wherein a content of the alkyl silicone compound (B) in the heat-conductive sheet is 2.0 to 20 parts by mass with respect to 100 parts by mass of a total of the silicone matrix (A) and the alkyl silicone compound (B), and the heat-conductive sheet has an expansion coefficient X of −2.0% or more and less than 0%, as measured by a thermomechanical analyzer (TMA) in the conditions of a compressive load of 0.01 N, a measurement temperature of 30 to 80° C., and a heating rate of 2° C./minute.

The heat-conductive sheet of the present invention can be mounted stably between two members (between the first and second members) by the mounting method comprising steps 1 to 3 as described below.

Step 1: disposing the heat-conductive sheet on the surface of the first member;

Step 2: heating the heat-conductive sheet;

Step 3: disposing a second member on a surface of the heat-conductive sheet, the surface being opposite from the first member side, and pressurizing the heat-conductive sheet, to install the heat-conductive sheet between the first and second members.

In this mounting method, the first and second members are not specifically limited; however, one may be a heating element, and the other may be a heat-dissipating element. The detailed descriptions of the heating element and the heat-dissipating element are as described above.

Step 1

In step 1, the heat-conductive sheet is disposed on the surface of the first member. The method for disposing the heat-conductive sheet is not specifically limited, and the heat-conductive sheet may be disposed such that one surface thereof is brought in contact with the first member.

In this method, it is preferable to perform step 2 after step 1, as will be described below. In such a case, the heat-conductive sheet having resilience before heating is disposed on the surface of the first member, and thus the workability in step 1 is good.

Step 2

In step 2, the heat-conductive sheet is heated. Step 2 may be performed after step 1, may be performed before step 1, or may be performed concurrently with step 1. However, step 2 is preferably performed after step 1, as described above. In other words, it is preferable that the heat-conductive sheet disposed on the surface of the first member should be heated in step 2.

In step 2, the heat-conductive sheet may be heated to a temperature equal to or higher than the melting point of the alkyl silicone compound (B). Accordingly, the heat-conductive sheet may be heated to a temperature higher than normal temperature (23° C.). It is heated to preferably 50° C. or more, more preferably 60° C. or more, further preferably 70° C. or more, in view of reliably melting the alkyl silicone compound (B) to enhance the flexibility of the heat-conductive sheet when installed (step 3 described later).

In view of preventing the heat-conductive sheet from being heated more than necessary, the heat-conductive sheet may be heated to 100° C. or less, preferably 90° C. or less, more preferably 85° C. or less.

When heated to a temperature equal to or higher than the melting point of the alkyl silicone compound (B) in step 2, the heat-conductive sheet can be easily fixed to the first and second members through the melted alkyl silicone compound (B) by pressurization in step 3.

The method for heating the heat-conductive sheet is not specifically limited, and the heat-conductive sheet may be heated by a heating device such as an infrared heater, a hot air heater, or a heat transfer heater.

Conventionally, a phase change sheet is generally softened or melted by heating of a heating element constituting any one of the first and second members. In contrast, the heat-conductive sheet in the mounting method is preferably heated by a heating device different from the heating element before being sandwiched between the first and second members. Such an embodiment enables the heat-conductive sheet to be fixed to the first and second members before the electronic device is used. Accordingly, it is also possible to install the heat-conductive sheet compressed at a compression ratio as designed.

Step 3

In step 3, a second member is disposed on a surface of the heat-conductive sheet, the surface being opposite from the first member side, and the heat-conductive sheet is pressurized to install the heat-conductive sheet between the first and second members.

In step 3, the second member may be disposed further on the heat-conductive sheet disposed on the surface of the first member, thereby sandwiching the heat-conductive sheet between the first and second members.

Step 3 may be performed concurrently with step 2 but is preferably performed after step 2. Accordingly, in step 3, the second member may be disposed further on the heat-conductive sheet disposed on the surface of the first member and already heated.

In this mounting method, it is more preferable to perform step 1, step 2, and step 3 in this order. Performing the steps in this order improves the workability.

The heat-conductive sheet sandwiched between the first and second members in step 3 has been heated in step 2 and thus may be further pressurized in the thickness direction in the heated state, in step 3. Here, pressurization may be performed, for example, by pressing the heat-conductive sheet sandwiched between the first and second members by the first and second members further in the thickness direction.

Since the temperature of the heat-conductive sheet becomes a temperature equal to or higher than the melting point of the alkyl silicone compound (B) during pressurization in step 3 to melt the alkyl silicone compound (B), the heat-conductive sheet may be fixed to the first and second members by the melted alkyl silicone compound (B).

As has been described above, the heat-conductive sheet of the present invention has a certain or more flexibility when heated and thus can follow the first and second members by pressurization in step 3. Accordingly, even if the first and second members have projections and recesses, the heat-conductive sheet can be in close contact with the first and second members to prevent increase in the heat resistance value. Further, the heat-conductive sheet can be installed without high stress applied on the first and second members. Further, the heat-conductive sheet has a shape retention even when heated, and accordingly, pump-outs are suppressed to enhance the reliability even when used in the compressed state, as described above. Further, since the heat-conductive sheet has a certain resilience before heating, the workability when installed can be improved.

Heat Dissipating Member

The present invention also provides a heat dissipating member comprising the aforementioned heat-conductive sheet and a heat-dissipating element, wherein the heat-conductive sheet is mounted on the surface of the heat-dissipating element. Such a heat dissipating member can be obtained, for example, by disposing the heat-conductive sheet on the surface of the heat-dissipating element and fixing the heat-conductive sheet to the surface of the heat-dissipating element. Here, the heat-conductive sheet may be fixed to the surface of the heat-dissipating element, for example, by heating it to a temperature of the melting point of the alkyl silicone compound (B) or higher, followed by pressurization. At this time, the heat-conductive sheet may be disposed on the surface of the heat-dissipating element after heating or may be heated after being disposed on the surface of the heat-dissipating element.

A heating element may be disposed on the surface of the heat-conductive sheet of the heat dissipating member, the surface being opposite from the heat-dissipating element side, thereby mounting the heat-conductive sheet between the heat-dissipating element and the heating element. The mounting method may be a method comprising steps 2 and 3 described above, and detailed descriptions are as described above and thus omitted.

EXAMPLES

Hereinafter, the present invention will be described in detail by way of examples, but the present invention is not limited at all to these examples.

The heat-conductive sheet obtained in each of Examples and Comparative Examples was evaluated by the following methods.

Heat Resistance Value

The heat resistance value was measured using a heat resistance value measuring machine as shown in FIG. 1 by the method shown below. Specifically, a test piece S for this test with a size of 30 mm×30 mm was prepared from each sample. Then, the test piece S was attached onto a copper block 22 having a surface for measurement of 25.4 mm×25.4 mm and lateral surfaces covered with a heat insulator 21, and sandwiched with an upper copper block 23, and a load of a pressure of 20 psi (0.138 MPa) was applied thereto by a load cell 26. Here, the lower copper block 22 was in contact with a heater 24. The upper copper block 23 was covered by the heat insulator 21 and connected to a heat sink 25 with fan. Then, the heater 24 was allowed to produce heat, and 10 minutes later, in which the temperature became substantially steady, the temperature of the upper copper block 23 ($\theta_{j0}$), the temperature of the lower copper block 22 ($\theta_{j1}$), and the calorific value (Q) of the heater were measured, to determine the heat resistance value $T_{10}$ of the sample from formula (2) below. The calorific value was adjusted such that the temperature of the heat-conductive sheet was 80° C.

$$\text{Heat resistance value} = (\theta_{j1} - \theta_{j0})/Q \qquad \text{formula (2)}$$

In formula (2), $\theta_{j1}$ represents the temperature of the lower copper block 22, $\theta_{j0}$ represents the temperature of the upper copper block 23, and Q represents the calorific value.

In addition, the heat resistance value $R_{40}$ was separately determined in the same manner as above except that the pressure by the load cell 26 was changed to 40 psi.

Compression Ratio

The heat-conductive sheet was cut into a size of 10 mm×10 mm, to measure the compression ratio when compressed at 40 psi (0.276 MPa) in an environment of 80° C. Specifically, a test piece was interposed between a pedestal with a flat surface having a size of 10 mm×10 mm and a depressor that pressed in parallel, and the thickness T2 when the test piece was compressed at 0.276 MPa was measured, to calculate the compression ratio with respect to the initial thickness T1, [100×(T1−T2)/T1].

Furthermore, the compression ratio was separately measured in the same manner as above except that the pressure was changed to 20 psi.

Expansion Coefficient X (with a Load of 0.01 N)

The expansion coefficient X was measured by a thermomechanical analyzer (TMA, "TMA-60", available from SHIMADZU CORPORATION) in the following manner.

The heat-conductive sheet (diameter: 6 mm, thickness: 0.3 mm) was compressed under a compressive load of 0.01 N at room temperature (23° C.). The thickness of the heat-conductive sheet at this time was taken as the initial thickness (mm). Then, while the heat-conductive sheet is kept under the aforementioned compressive load, the temperature was raised at a heating rate 2° C./minute from 30° C. to 80° C., to determine the expansion coefficient (%) at 30° C. and the expansion coefficient (%) at 80° C. each, so that the expansion coefficient X in the present invention was determined by the following formula.

$$\text{Expansion coefficient } X\,(\%) = \text{Expansion coefficient (\%) at 80° C.} - \text{Expansion coefficient (\%) at 30° C.}$$

The expansion coefficient at 30° C. was determined from the thickness at 30° C. (mm) and the initial thickness (mm) of the heat-conductive sheet in the following manner. Likewise, the expansion coefficient at 80° C. was determined from the thickness at 80° C. (mm) and the initial thickness (mm) of the heat-conductive sheet in the following manner.

$$\text{Expansion coefficient (\%) at 30° C.} = 100\times[(\text{Thickness at 30° C.} - \text{Initial thickness})/\text{Initial thickness}]$$

$$\text{Expansion coefficient (\%) at 80° C.} = 100\times[(\text{Thickness at 80° C.} - \text{Initial thickness})/\text{Initial thickness}]$$

Expansion Coefficient (Without Load)

The expansion coefficient was determined in the same manner as above except that the compressive load was changed to 0.005 N. Further, the expansion coefficient was determined in the same manner as above except that the compressive load was changed to 0.015 N.

Then, for the graph in which the resulting relationship of the compressive loads and the expansion coefficients was plotted, linear approximation was made using the least squares method to obtain an approximate equation, from which the expansion coefficient (estimated value) without load (compressive load: 0 N) was determined.

Load Due to Expansion

The load on each member (such as the heating element or the heat-dissipating element) due to the expansion of the heat-conductive sheet was evaluated on a 5-point scale: A, B, C, D, and E, in descending order of load. A corresponds to the smallest load and is an excellent evaluation.

Adhesion Force

The adhesion force (tensile shear strength) was measured according to the tensile shear test of JIS K6850:1999.

The heat-conductive sheet (length: 20 mm, width: 20 mm, thickness: 0.2 mm) produced by the method of each of Examples and Comparative Examples was sandwiched between two aluminum sheets (length: 30 mm, width: 100 mm, thickness: 0.012 mm). At this time, the aluminum sheets were disposed so that their tips overlapped each other with a length of 25 mm×25 mm. Then, they were pressure bonded at a temperature of 80° C. and a pressure of 20 psi for 3 minutes, to produce a test sample. The test sample was naturally cooled to 25° C., subjected to a tensile test at room temperature of 25° C. and a tensile speed of 500 mm/min, using a tensile tester (available from Toyo Seiki Seisaku-sho, Ltd.), to measure the adhesion force (tensile shear strength). Based on the found adhesion force (MPa), the adhesion was evaluated on the following scale.

A: Adhesion force of 1.4 MPa or more

B: Adhesion force of 1.0 MPa or more and less than 1.4 MPa

C: Adhesion force of 0.4 MPa or more and less than 1.0 MPa

D: Adhesion force of 0.3 MPa or more and less than 0.4 MPa

E: Adhesion force of less than 0.3 MPa

Handleability

The severity of defects associated with the incorporation of the alkyl silicone compound was evaluated for the heat-conductive sheet produced in each of Examples and Comparative Examples as a sample in the following manner. The defects were evaluated on a 5-point scale: A, B, C, D, and E in descending order of severity.

A: No defects occurred due to the incorporation of the alkyl silicone compound, and the heat-conductive sheet had an appropriate rigidity at room temperature (23° C.), and was thus easily attached to each member (such as the heating element or the heat-dissipating element).

B: The heat-conductive sheet had a low rigidity at room temperature (23° C.), and was thus slightly easy to be stretched when attached to each member (such as the heating element or the heat-dissipating element).

C: The heat-conductive sheet was excessively rigid at room temperature (23° C.), so that cracks tended to appear when the heat-conductive sheet is attached to each member (such as the heating element or the heat-dissipating element).

D: The heat-conductive sheet had an extremely low rigidity at room temperature (23° C.), and was thus easy to be stretched when attached to each member (such as the heating element or the heat-dissipating element).

E: The heat-conductive sheet was excessively rigid at room temperature (23° C.), so that the heat-conductive sheet breaks when attached to each member (such as the heating element or the heat-dissipating element).

Comprehensive Evaluation

The worse result in the evaluations of "load due to expansion" and "handleability" was used for the "comprehensive evaluation".

Example 1

Polyoctadecyl methyl siloxane (melting point (Tm): 50° C.) as the alkyl silicone compound (B) and n-decyl trimethoxysilane as the compatible substance (D) were mixed at 23° C. in amounts in the formulation according to Table 1, to obtain a mixture composed of the compatible substance (D) and the alkyl silicone compound (B) dissolved therein. The mixture obtained, a silicone base resin (alkenyl group-containing organopolysiloxane) and a silicone curing agent (hydrogen organopolysiloxane) as the curable silicone composition (A1), and a catalyst (platinum catalyst) were uniformly mixed, and the resultant was then mixed with the heat-conductive filler (C) according to the formulation shown in Table 1, to obtain a mixed composition.

As the heat-conductive filler (C), aluminum powder (spherical, particle size: 3 μmm, aspect ratio: 1 to 1.5, thermal conductivity: 236 W/m·K) and aluminum oxide powder (spherical, particle size: 0.5 μm, aspect ratio: 1, thermal conductivity: 32 W/m·K) were used as non-anisotropic fillers. Flaky graphite powder (average particle size: 40 μm, aspect ratio: 10, thermal conductivity: 550 W/m·K), graphitized carbon fiber 1 (average fiber length: 77 μm, aspect ratio: 8, thermal conductivity: 1200 W/m·K), and graphitized carbon fiber 2 (average fiber length: 150 μm, aspect ratio: 15, thermal conductivity: 900 W/m·K) were used as the anisotropic filler. The volume filling rate of the heat-conductive filler (C) in each of Examples and Comparative Examples was 66 vol %.

The melting point is a temperature at the endothermic peak in the DTA curve measured by thermogravimetric differential thermal analysis (TGDTA, "DTG-60" available from SHIMADZU CORPORATION) at a heating rate of 1° C./min.

Subsequently, the mixed composition was injected into a mold set so as to have a sufficiently larger thickness than the heat-conductive sheet, and an 8T magnetic field was applied in the thickness direction to orient the anisotropic filler in the thickness direction. Thereafter, the curable silicone composition (A1) was cured by heating at 80° C. for 60 minutes, to obtain an oriented molded product in the form of a block.

Then, using a shearing blade, the oriented molded product in the form of a block was sliced into a sheet, to obtain a sheet-form product in the surface of which the anisotropic filler was exposed, followed by further heating at 150° C. for 2 hours. Thus, the sheet-form product was obtained. Furthermore, both surfaces of the sheet-form product were polished back and forth 50 times with coarse abrasive paper A (grain size #800) having an average grain size (D50) of 20 μm, to obtain a polished heat-conductive sheet. The heat-conductive sheet obtained was evaluated for each property. Table 1 shows the results.

Examples 2 to 4

A heat-conductive sheet was obtained in the same manner as in Example 1 except that the amount of each component mixed was changed to the amount shown in Table 1. The heat-conductive sheet obtained was evaluated for each property. Table 1 shows the results.

Comparative Example 1

A heat-conductive sheet was obtained in the same manner as in Example 1 except that a mixed composition obtained by mixing components according to the formulation shown in Table 1 was used without using the alkyl silicone compound (B). Table 1 shows the evaluation results for the heat-conductive sheet obtained in Comparative Example 1.

Comparative Examples 2 to 3

A heat-conductive sheet was obtained in the same manner as in Example 1 except that the amount of each component mixed was changed to the amount shown in Table 1. The heat-conductive sheet obtained was evaluated for each property. Table 1 shows the results obtained in Comparative Example 2.

TABLE 1

| | | | Example 1 | Example 2 | Example 3 | Example 4 | Comparative Example 1 | Comparative Example 2 | Comparative Example 3 |
|---|---|---|---|---|---|---|---|---|---|
| Formulation (parts by mass) | Curable silicone composition (A1) | Silicone base resin | 88.2 | 81.8 | 77.3 | 72.7 | 90.9 | 90.0 | 67.5 |
| | | Silicone curing agent | 8.8 | 8.2 | 7.7 | 7.3 | 9.1 | 9.0 | 7.5 |
| | Additive | Catalyst | 0.2 | 0.2 | 0.2 | 0.2 | 0.2 | 0.2 | 0.2 |
| | Alkyl silicone (B) | Polyoctadecyl methyl siloxane | 3 | 10 | 15 | 20 | 0 | 1 | 25 |
| | Heat-conductive filler (C) | Aluminum powder, 3 μm (average particle size) | 243 | 243 | 243 | 243 | 243 | 243 | 243 |
| | | Aluminum oxide powder, 0.5 μm (average particle size) | 30 | 30 | 30 | 30 | 0 | 30 | 30 |
| | | Flaky graphite powder, 40 μm (average long-axis length) | 20 | 20 | 20 | 20 | 20 | 20 | 20 |
| | | Graphitized carbon fiber 1, 77 μm (average fiber length) | 160 | 160 | 160 | 160 | 155 | 160 | 160 |
| | | Graphitized carbon fiber 2, 150 μm (average fiber length) | 10 | 0 | 0 | 0 | 10 | 10 | 0 |
| | Compatible substance (D) | n-Decyltrimethoxysilane | 27 | 27 | 27 | 27 | 15 | 27 | 27 |
| Measurement results | | 20 psi heat resistance $R_{10}$ (° C. · $in^2$/W) 80° C. | 0.022 | 0.020 | 0.018 | 0.021 | 0.027 | 0.024 | 0.025 |
| | | 20 psi thickness found in measurement $T_{10}$ (mm) | 0.184 | 0.143 | 0.155 | 0.166 | 0.172 | 0.174 | 0.164 |
| | | 20 psi compression ratio % | 14% | 27% | 19% | 11% | 12% | 13% | 13% |
| | | 40 psi heat resistance $R_{40}$ (° C. · $in^2$/W) 80° C. | 0.018 | 0.017 | 0.016 | 0.014 | 0.022 | 0.020 | 0.021 |

TABLE 1-continued

| | | Example 1 | Example 2 | Example 3 | Example 4 | Comparative Example 1 | Comparative Example 2 | Comparative Example 3 |
|---|---|---|---|---|---|---|---|---|
| Evaluation | 40 psi thickness found in measurement $T_{40}$ (mm) | 0.172 | 0.130 | 0.141 | 0.152 | 0.159 | 0.150 | 0.155 |
| | 40 psi compression ratio % | 20% | 33% | 27% | 18% | 23% | 25% | 21% |
| | Expansion coefficient (Load: 0.005N) | −0.32% | −0.43% | −0.50% | −1.14% | 0.25% | 0.15% | −1.80% |
| | Expansion coefficient X (Load: 0.01N) | −0.49% | −0.83% | −0.93% | −1.40% | 0.21% | 0.09% | −2.10% |
| | Expansion coefficient (Load: 0.015N) | −0.94% | −1.15% | −1.30% | −1.67% | 0.17% | 0.04% | −2.40% |
| | Estimated expansion coefficient (Without load) | −0.01% | −0.08% | −0.11% | −0.87% | 0.29% | 0.21% | −1.50% |
| | Load due to expansion | C | B | B | A | E | D | A |
| | Adhesion force (MPa) | 0.45 | 1.38 | 1.40 | 1.55 | 0.25 | 0.30 | 1.62 |
| | Adhesion | C | B | A | A | E | D | A |
| | Handleability | B | A | A | C | D | D | E |
| | Comprehensive evaluation | C | B | A | C | E | D | E |

It turned out that the heat-conductive sheets of Examples 1 to 4, which were heat-conductive sheets that satisfied the requirements of the present invention, were difficult to expand, resulting in a rate "C" or higher in evaluation of the load due to expansion, and were thus less likely to apply a load on the heating element, the heat-dissipating element, and the like. They also resulted in a rate "C" or higher in evaluation of handleability, so that defects due to adding the alkyl silicone compound were also less likely to occur. In addition, they had a low heat resistance value and excellent thermal conductivity.

Since the heat-conductive sheets obtained in Examples were sheets that were comparatively rigid at room temperature, which is lower than the melting point of the alkyl silicone compound (B), it was possible to obtain the heat-conductive sheets by slicing, as described above, with excellent handleability. In addition, since it did not become liquid nor flow out even at 80° C., no pump-outs occurred even in long-term compression, so that the reliability was good. Furthermore, no air bubbles were observed in the surface of the heat-conductive sheets, so that the appearance was good.

In contrast, it turned out that the heat-conductive sheets of Comparative Examples 1 and 2, which had a lower content of the alkyl silicone compound than the amount specified in the present invention, easily expand to result in a rate D or E in evaluation of the load due to expansion, so that they tend to apply a load on the heating element, the heat-dissipating element, and the like. In addition, they had a high heat resistance value and poor thermal conductivity.

Furthermore, the heat-conductive sheet of Comparative Example 3 had a content of the alkyl silicone compound (B) of over 20 parts by mass with respect to 100 parts by mass of a total of the silicone matrix (A) and the alkyl silicone compound (B). Therefore, this heat-conductive sheet was excessively rigid at room temperature (23° C.), and broke when attached to each member (such as the heating element or the heat-dissipating element), resulting in poor handleability.

REFERENCE SIGNS LIST

21: Heat insulator
22: Lower copper block
23: Upper copper block
24: Heater
25: Heat sink
26: Load cell
S: Test piece
$\theta_{j0}$: Temperature of upper copper block
$\theta_{j1}$: Temperature of lower copper block

The invention claimed is:

1. A heat-conductive sheet comprising:
a binder component that is a mixture of a silicone matrix (A) and an alkyl silicone compound (B); and
a heat-conductive filler (C) dispersed in the binder component,
a content of the alkyl silicone compound (B) being 2.0 to 20 parts by mass with respect to 100 parts by mass of a total of the silicone matrix (A) and the alkyl silicone compound (B), and
the heat-conductive sheet having an expansion coefficient X of −2.0% or more and less than 0%, as measured by a thermomechanical analyzer (TMA) in the conditions of a compressive load of 0.01 N, a measurement temperature of 30 to 80° C., and a heating rate of 2° C./minute.

2. The heat-conductive sheet according to claim 1, wherein the alkyl silicone compound (B) has a melting point higher than 23° C. and 80° C. or less.

3. The heat-conductive sheet according to claim 1, wherein the alkyl silicone compound (B) is a silicone compound comprising an alkyl group having 8 to 26 carbon atoms.

4. The heat-conductive sheet according to claim 1, wherein the heat-conductive filler (C) comprises an anisotropic filler, and the anisotropic filler is orientated in the thickness direction.

5. The heat-conductive sheet according to claim 1, wherein the heat-conductive filler (C) has a volume filling rate of 30 to 85 vol %.

6. The heat-conductive sheet according to claim 1, further comprising 0.1 to 18 parts by mass of a compatible substance (D) with respect to 100 parts by mass of a total of the silicone matrix (A) and the alkyl silicone compound (B).

7. A heat dissipating member comprising: the heat-conductive sheet according to claim 1; and a heat-dissipating element, wherein the heat-conductive sheet is mounted on the surface of the heat-dissipating element.

8. A method for mounting a heat-conductive sheet, the method comprising:

disposing a heat-conductive sheet on a surface of a first member, the heat-conductive sheet comprising: a binder component being a mixture of a silicone matrix (A) and an alkyl silicone compound (B); and a heat-conductive filler (C) dispersed in the binder component; a content of the alkyl silicone compound (B) being 2.0 to 20 parts by mass with respect to 100 parts by mass of a total of the silicone matrix (A) and the alkyl silicone compound (B), and the heat-conductive sheet having an expansion coefficient X of −2.0% or more and less than 0%, as measured by a thermomechanical analyzer (TMA) in the conditions of a compressive load of 0.01 N, a measurement temperature of 30 to 80° C., and a heating rate of 2° C./minute;

heating the heat-conductive sheet; and disposing a second member on a surface of the heat-conductive sheet, the surface being opposite from the first member side, and pressurizing the heat-conductive sheet, to install the heat-conductive sheet between the first and second members.

9. The method for mounting a heat-conductive sheet according to claim 8, wherein the alkyl silicone compound (B) has a melting point higher than 23° C., and the heat-conductive sheet is heated to a temperature equal to or higher than the melting point.

* * * * *